United States Patent
Buschbeck

(10) Patent No.: US 8,446,654 B2
(45) Date of Patent: *May 21, 2013

(54) HOLOGRAPHIC RECONSTRUCTION SYSTEM AND METHOD WITH AN ENLARGED VISIBILITY REGION

(75) Inventor: Steffen Buschbeck, Jena (DE)

(73) Assignee: Seereal Technologies S.A., Munsbach (LU)

( * ) Notice: Subject to any disclaimer, the term of this patent is extended or adjusted under 35 U.S.C. 154(b) by 753 days.

This patent is subject to a terminal disclaimer.

(21) Appl. No.: 12/601,013

(22) PCT Filed: May 14, 2008

(86) PCT No.: PCT/EP2008/055891

§ 371 (c)(1),
(2), (4) Date: Nov. 20, 2009

(87) PCT Pub. No.: WO2008/141987

PCT Pub. Date: Nov. 27, 2008

(65) Prior Publication Data

US 2010/0165430 A1 Jul. 1, 2010

(30) Foreign Application Priority Data

May 21, 2007 (DE) .................... 10 2007 024 235

(51) Int. Cl.
*G03H 1/08* (2006.01)
(52) U.S. Cl.
USPC .......................................................... 359/9
(58) Field of Classification Search
USPC ........................................ 359/9, 32
See application file for complete search history.

(56) References Cited

U.S. PATENT DOCUMENTS 6,595,644 B2 * 7/2003 Kostrzewski et al. ............ 353/7
7,190,496 B2 * 3/2007 Klug et al. ..................... 359/23

FOREIGN PATENT DOCUMENTS

| JP | 09068674 | 3/1997 |
| WO | WO 2004/044659 | 5/2004 |
| WO | WO 2007/099457 | 9/2007 |
| WO | WO 2008/077789 | 7/2008 |
| WO | WO 2008/092852 | 8/2008 |

OTHER PUBLICATIONS

International Search Report, dated Sep. 23, 2008, issued in priority International Application No. PCT/EP2008/055891.
Fukaya et al., "Eye-position tracking type electro-holographic display using liquidcrytsal devices," Asia Display, pp. 963/964 (Jan. 1, 1995) XP002940561.

* cited by examiner

*Primary Examiner* — Alessandro Amari
(74) *Attorney, Agent, or Firm* — Saul Ewing LLP

(57) ABSTRACT

A holographic reconstruction system and a corresponding holographic reconstruction method are disclosed. The holographic reconstruction system comprises light source means for providing substantially coherent light, reconstruction means for holographically reconstructing a scene and for producing a visibility region from where the viewer can view the holographically reconstructed scene, and deflection means for positioning the visibility region. The aim of the invention is to improve the visibility region of a holographic reconstruction system. To achieve this aim, the holographic reconstruction system comprises deflection drive means for continuously rotating or pivoting the deflection means about a rotational axis at a rotary frequency, thereby displacing the visibility region. The invention allows one or more viewers to view the scene reconstructed by means of the holographic reconstruction system from different positions while facilitating the implementation of the holographic reconstruction system with conventional means.

15 Claims, 6 Drawing Sheets

HOLOGRAPHIC RECONSTRUCTION SYSTEM AND METHOD WITH AN ENLARGED VISIBILITY REGION

CROSS REFERENCE TO RELATED APPLICATIONS

This application claims the priority of PCT/EP2008/055891, filed on May 14, 2008, which claims priority to German Application No. 10 2007 024235.4, filed May 21, 2007, the entire contents of which are hereby incorporated in total by reference.

BACKGROUND OF THE INVENTION

The present invention relates to a holographic reconstruction system with an enlarged visibility region, and to an according method. The holographic reconstruction system comprises light source means for providing substantially coherent light, reconstruction means for the holographic reconstruction of a scene and for generating a visibility region from which an observer can watch the holographically reconstructed scene, and deflection means for positioning the visibility region.

In a holographic reconstruction system, sufficiently coherent light is modulated by spatial light modulator means (SLM), e.g. a liquid crystal display (LCD). A diffractive structure, the hologram or a sequence of holograms, is encoded on the SLM. Object light points are generated through interference of the light which is modulated with holograms in the SLM. The entirety of those object light points form the three-dimensional reconstruction of an object or scene. The light of all object light points propagates in the form of a light wave front, so that one or multiple observers can watch those object light points from an eye position as a three-dimensional scene. For the observer, the light appears not to come from the SLM, but from the three-dimensional object reconstruction, i.e. from multiple depth planes. The observer focuses his eyes on the object reconstruction with its multiple depth planes. The eyes can only see the light which is diffracted by the SLM, but not the light which is transmitted directly. When watching a holographic display, an observer thus ideally has the same impression as if they watched a real object. This means that in contrast to a stereoscopic representation, a holographic reconstruction realises an object substitute, which is why the problems known in conjunction with stereoscopy, such as fatigue of the eyes and headache, do not occur, because there is generally no difference between watching a real scene and a holographically reconstructed scene.

Known holographic reconstruction systems, for example as disclosed by the applicant in the international patent application WO2004/044659, are substantially based on the following general principle: A wave front which is spatially modulated with holographic information reconstructs the three-dimensional scene in a reconstruction space which is positioned in front of one or both eyes of one or multiple observers. The holograms can also be encoded such that the object light points do not only appear in front of, but also on and behind the display screen. The reconstruction space stretches from the exit surface of a display screen, through which the modulated wave fronts leaves the reconstruction system, to a visibility region. The visibility region has a finite extent in one plane, for example corresponding to the size of an eye or eye pupil. If at least one eye of an observer is situated in the visibility region, the observer will be able to watch the holographically reconstructed scene.

The size of the visibility region depends on the focal length of the holographic reconstruction system, the wavelength of the used light and the pixel pitch of the spatial light modulator for encoding the scene to be holographically reconstructed. The larger the desired visibility region the higher must be the resolution of the SLM used. In order to get a large visibility region, the SLM must have very small pixel apertures which cause great diffraction angles, i.e. the SLM must have a small pixel pitch and, consequently, a large number of pixels.

In order to reduce the necessary resolution of the SLM, the size of the visibility region can for example be diminished to the size of an eye pupil. However, this may lead to problems with the visibility of the three-dimensional reconstruction, if the observer eye is only partly situated inside the visibility region. Already a slight movement of the observer may cause effects such as disappearance of visibility, vignetting or distortion of the spatial frequency spectrum. Moreover, the borders of the reconstruction space are difficult to find for an observer whose eyes are situated outside the visibility region. It is therefore necessary for the position of the visibility region to be adapted to the new eye position if an observer moves.

Because in a small visibility region the observer can see the holographic reconstruction with one eye only, a second wave front, which is directed at the other eye, must provide a second reconstruction which differs in parallax. Because both reconstruction spaces must have the same base on the display screen in order to ensure perception of the two reconstruction spaces free from optical errors, their respective wave fronts are spatially or temporally interleaved with the help of known autostereoscopic means. Spatial frequency filters and focusing means prevent optical cross-talking between the wave fronts. If the reconstruction system is additionally meant to allow multiple observers to watch different reconstructions simultaneously, additional wave fronts will be required, typically two for each observer. These additional waves can be generated either in a space-division or in a time-division multiplex process.

In order to maintain a certain clarity, the description below relates mainly to the alignment of a single wave front of the holographic system. The reconstruction system can realise further wave fronts in analogy to the first one, if required. It appears to those skilled in the art that the idea of this invention can be applied as often as necessary for this, depending on the actual number of wave fronts. When doing so, functional elements of the invention can preferably be used commonly for multiple wave fronts.

Known systems comprise an eye finder and a deflection unit for example a scanner mirror. The eye position is detected by the eye finder. The required angular position of the deflection unit is found based on that eye position, and the deflection unit is controlled accordingly in order to match the position of the visibility region to the eye position. At the controlled position, the deflection unit must rest for a moment so that the hologram can be reconstructed. Then, the next eye position is detected and so on. This causes the deflection unit to move intermittently, which is difficult to be realised using conventional means, in particular at high frequencies, e.g. higher than 20 Hz.

With a small visibility region, it is further required that the eye finder detects the eye position with a very high accuracy. For example, if the size of the visibility region is between 5 to 10 mm, the eye finder should detect the eye position with a maximum error of about 1 mm. Again, this is difficult to be realised using conventional means.

SUMMARY OF THE INVENTION

It is therefore the object of the present invention to provide a holographic reconstruction system which allows one or multiple observers to watch the reconstructed scene from various positions, and which can be realised in a simple manner using conventional means.

The object is solved by a holographic reconstruction system according to this invention with deflection drive means for continuously rotating or pivoting the deflection means with a rotary or pivoting frequency around a rotation axis, thus displacing the visibility region, and by a corresponding method. (The terms 'rotating', 'rotation' and 'rotary frequency' will be used hereinafter synonymously with 'pivoting' and 'pivoting frequency'.)

This invention is based on the idea that the deflection means or the scanner mirror continuously rotate around a rotation axis or continuously pivot over an angular range such that the entire angular range is permanently scanned. This results in a continuous movement of the visibility region. If the rotary frequency of the scanner mirror is sufficiently high, e.g. greater than 50 Hz, the visibility region will cover an observer position often enough, and a reconstruction of the hologram becomes visible. An eye finder is thus not necessary to watch the hologram. The observer(s) must only be situated in the scanned region and will be served automatically. This way, an 'enlarged visibility region' is generated.

How an observer sees the reconstruction of the hologram depends on his position within the visibility region. If the position of the observer in the visibility region changes, the perspective from which the observer watches the reconstruction will also change. With a movable visibility region, the observer would remain in his observer position; but he will watch all perspectives while the visibility region covers his eye. In a larger visibility region, which is for instance larger than the eye pupil, this could cause a blurred perception of a reconstructed hologram point by the observer because he would see the point from different perspectives quickly one after another. The eye must not perceive this movement in order to prevent the reconstructed points from being blurred. On the one hand, it therefore makes sense to diminish the visibility region, so that an observer has less or even no freedom of movement within the visibility region. On the other, it is possible to modulate the light source, e.g. to use a pulsed laser, where the frequency of the laser is adapted to the movement of the visibility region, such that an observer does not perceive this movement.

The perspective from which the hologram is visible, is also taken into consideration when computing a hologram for a certain observer position. This perspective is different for each position of the visibility region, i.e. a different hologram had to be encoded for each position of the visibility region, and it thus also differs for the left and right eye if the visibility region is not large enough to serve both eyes simultaneously. It is then necessary for the two eyes to watch differently computed holograms.

However, it is sufficient to compute a hologram for those positions only where an observer eye is actually situated and not for all possible positions of the visibility region. An eye finder will then be necessary to detect the position of an observer eye. In order to ensure that the observer is able to watch the holographically reconstructed scene homogeneously, even if the eye finder detects the eye position at low accuracy, the hologram can be computed for a certain position of the visibility region depending on the detected eye position but be maintained over multiple positions of the visibility region which cover at least the area of the eye.

In a preferred embodiment of the solution according to this invention, a laser light source is used as the light source means. It is further preferred that the light source means periodically provide light pulses at a certain switching frequency. The light source means can for example have the form of a pulsed laser. In order to control the switching frequency, the reconstruction system can further comprise light source control means. In another embodiment, the holographic reconstruction system further comprises deflection drive control means for controlling the rotary frequency of the deflection drive means. Switching frequency and rotary frequency preferably have a certain ratio. In a special embodiment, switching frequency and rotary frequency can correspond such that the light source means deliver up to one light pulse within a displacement distance which corresponds to the extent of the visibility region in the direction of displacement. Switching frequency and/or rotary frequency can therein be controlled. Thanks to this design, it can be avoided that the observer perceives multiple perspectives while the visibility region passes his eye. This way, a blurred perception of the scene can be prevented.

In another preferred embodiment, the scene to be holographically reconstructed is computed by the reconstruction means depending on the position of the visibility region. Preferably, the computation is only carried out when the light source means provide light. In other words, it is possible to compute the scene to be holographically reconstructed for each possible position of the visibility region, in order to consider the perspective from which the reconstructed scene would be perceived from those positions of the visibility region. However, it makes sense for a hologram not to be computed and encoded unless the light source means actually provide light.

It is further preferred that the reconstruction means are provided for computing a scene to be holographically reconstructed for at least one selected position of the visibility region and for providing the computed scene to be holographically reconstructed for at least one position of the visibility region which succeeds the selected position. In other words, a hologram is not computed for all positions of the visibility region, but only for selected positions, which are for example selected based on the eye position. The hologram is not recomputed for subsequent positions of the visibility region, or at least for one subsequent position, the hologram which has been computed for the selected position continues to be used instead. This is shown in detail in the description of FIG. 3.

In an embodiment of the present invention, the reconstruction means comprise first optical means, in particular spatial light modulator means, in front of the deflection means in the optical path and second optical means behind the deflection means in the optical path. The first optical means can further comprise at least one telecentric lens and the second optical means can comprise at least one projection lens. A projection mirror can be used as an alternative to the projection lens.

The deflection means are preferably a mirror, in particular a front surface mirror. The deflection means can further be planar mirrors or can have a spherical or aspherical effect. Thanks to the spherical or aspherical effect, additional optical effects can be achieved. It is for example possible to integrate additional components of the holographic reconstruction system into the deflection means.

In a preferred embodiment, the deflection means and the deflection drive means are interconnected such that the rotation axis of the deflection drive means lies in the plane of the reflecting surface of the deflection means. The holographically reconstructed scene does thus not move in relation to the display screen due to the rotation of the deflection means. If the reflecting surface does not lie on the rotation axis, the mirror will due to its rotation change the optical position of the optical image which is projected towards the deflection means in relation to the projection lens. This embodiment is explained in detail in the description of FIG. 6.

In one embodiment, the deflection drive means are direct-current motors. Generally, any other type of drive which allows the deflection means to be rotated or pivoted and which can provide a sufficiently high and uniform rotary frequency can also be used.

In another embodiment, the holographic reconstruction system comprises eye position detection means for detecting the position of at least one observer eye. The light source means can then provide light depending on the detected position of the observer eye. For example, light pulses could be provided only in a region in front of, at or behind an eye position, seen in the direction of displacement of the visibility region. Moreover, the reconstruction means can then preferably compute the scene to be holographically reconstructed depending on the detected position of the observer eye. It is for example possible to compute a hologram only for the detected eye position. Or, in a further embodiment, a hologram is computed for a position of the visibility region which lies in front of the eye position, seen in the direction of displacement of the visibility region, and for the subsequent position(s) of the visibility region. This way, the computational load required for providing the hologram can be reduced and light energy can be saved.

The invention further relates to a method for the holographic reconstruction of a scene in a holographic reconstruction system with an enlarged visibility region. The method comprises the provision of substantially coherent light, the holographic reconstruction of a scene, the generation of a visibility region with a certain extent from which an observer can watch the holographically reconstructed scene, the positioning of the visibility region with the help of deflection means, and the continuous rotation or pivoting of the deflection means at a rotary frequency around a rotation axis in order to displace the visibility region.

BRIEF DESCRIPTION OF THE DRAWINGS

The present invention is described in more detail below with reference to the drawings, wherein.

DETAILED DESCRIPTION

Figure 1:
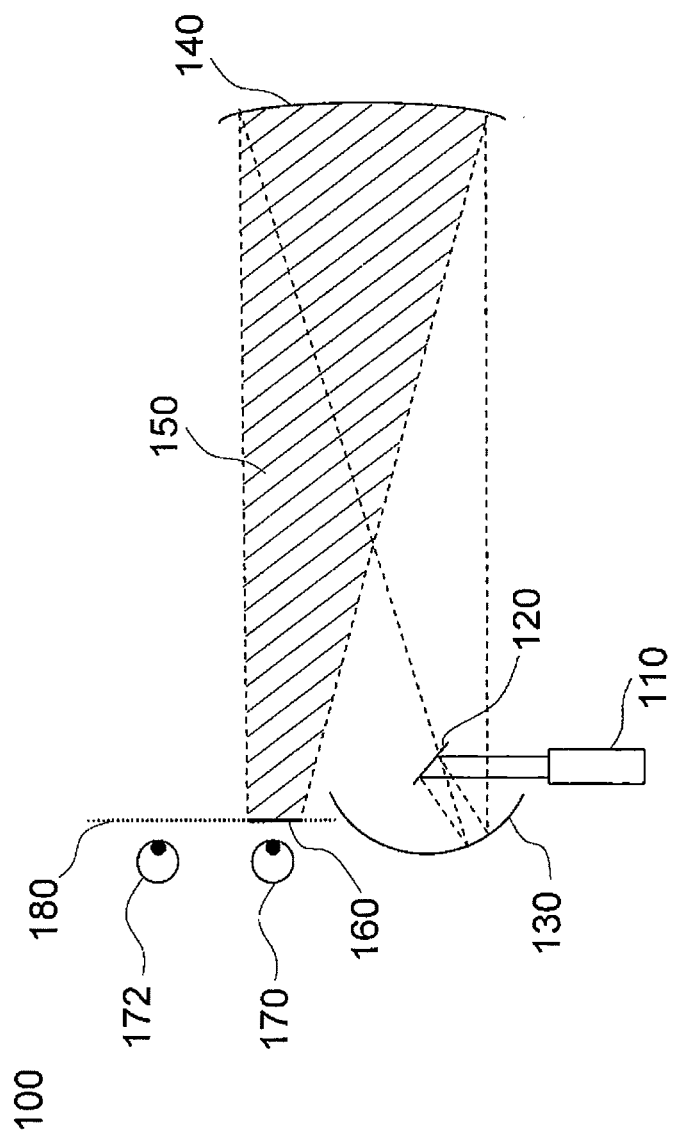
FIG. 1 is a top view providing a simplified illustration of the principle of the present invention, which shows the visibility region at a first point of time.

FIG. 1 is a top view which shows in a simplified diagram the principle of, the present invention. The position of the visibility region at a first point of time is shown.

The shown holographic reconstruction system 100 comprises first optical means 110, deflection means 120, projection means 130, and a display screen 140. The drawing further shows a reconstruction space 150 which stretches between display screen 140 and a visibility region 160, a first eye position 170, a second eye position 172, and an enlarged visibility region 180.

The first optical means 110 here comprise a hologram projector, which projects an intermediate image of a hologram, which is encoded on a spatial light modulator (SLM) (not shown in this drawing), onto the deflection means. The first optical means 110 are disposed in front of the deflection means 120 in the optical path.

Figure 6:
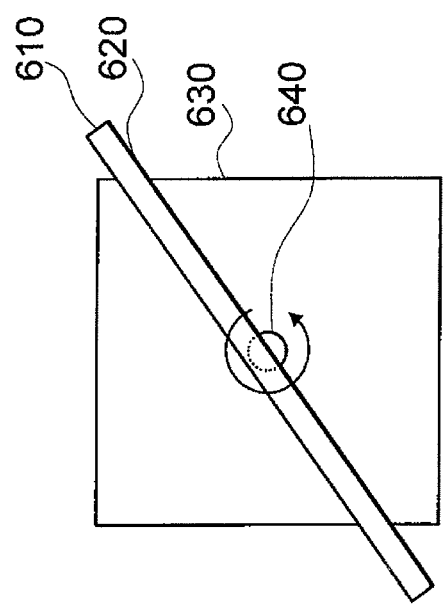
FIG. 6 is a simplified top view showing the mutual arrangement of deflection means and deflection drive means.

The deflection means 120, for example a plane mirror, change the direction of the image of the SLM, which is projected onto them by the hologram projector 110, towards the projection means 130. It is also possible for the deflection means 120 to be spherical or aspherical mirrors, so that they realise an additional optical effect. This allows several optical functions to be combined in one element. The deflection means 120 are pivoted, where the rotation axis lies in the plane of the mirror surface. This is shown in FIG. 6.

The projection means 130 are designed in the form of spherical, in particular elliptic mirrors in this drawing. Using a projection mirror is preferred to a projection lens because a larger extent of the enlarged visibility region 180 can be realised when a projection mirror is used. The projection means 130 reflect the light which is incident on them towards the display screen 140.

The display screen 140 is also a spherical mirror and it reflects the incident light towards a certain direction, depending on its shape and the angle of incidence. The visibility region 160 is thus generated from which the observer can watch the holographically reconstructed scene in the reconstruction space 150 when at least one eye is situated within this visibility region. This means that an eye which is situated at the eye position 170 can watch the holographically reconstructed scene in the reconstruction space 150.

Both the first eye position 170 and the second eye position 172 can refer to the same eye, which has moved from the first to the second eye position, or to different eyes, e.g. the observer's left and right eye, or the left eye of one observer and the right eye of another observer. An eye which is situated at the second eye position 172 at the first point of time shown in this drawing, would not see any reconstruction of the three-dimensional scene at that point. However, the rotation frequency of the deflection means 120 is preferably high enough for an observer not to perceive the time difference between two revolutions and the consequent occurrence of the visibility region 160 in front of his eye.

Figure 2:
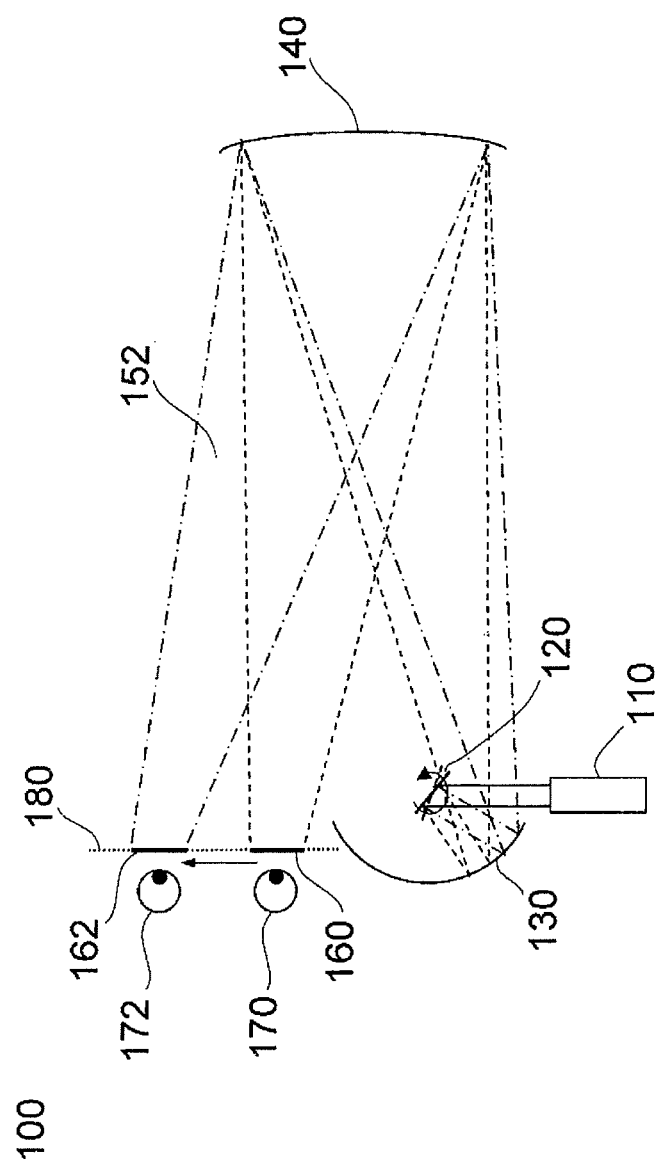
FIG. 2 is a top view providing a simplified illustration of the principle of the present invention, which shows the visibility region at a first point of time and at a second point of time.

FIG. 2 is a top view which shows in a simplified diagram the principle of the present invention. The position of the visibility region is shown at a first point of time, as in FIG. 1, and, additionally, at a second point of time. The arrangement is the same as shown in FIG. 1. Further, FIG. 2 shows a second position of the visibility region 162 and a second position of the reconstruction space 152.

A continuous rotation of the deflection means 120 displaces the visibility region 160 continuously within the enlarged visibility region 180. At the second point of time the visibility region is situated at the second position of the visibility region 162. An eye which is situated at the second eye position 172 at the second point of time can watch the holographically reconstructed scene in the reconstruction space 152 at that point of time.

Figure 3:
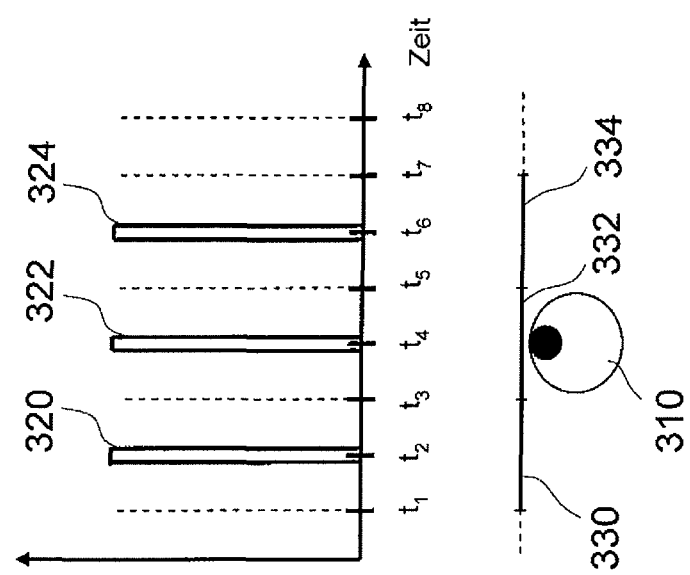
FIG. 3 is a schematic view which illustrates the generation of the visibility region by light pulses.

FIG. 3 is a schematic view which illustrates the generation of the visibility region by light pulses. This drawing shows an eye position 310, light pulses 320, 322, 324 and positions of the visibility region 330, 332, 334 at points of time t1 to t8.

Between the points of time t3 and t5 the visibility region 332 covers the position of an observer eye 310. This means that the observer can watch a reconstruction during that period of time. Now, if the illuminating laser is only turned on for a limited period of time, which is equal or less than t5−t3, the observer can only watch a small perspective section of the reconstruction, irrespective of where exactly he is situated within the visibility region.

The light source means periodically provide light pulses 320, 322, 324 with corresponding timing. The light pulses 320, 322, 324 have a switching frequency. The switching frequency of the light pulses 320, 322, 324 and the rotation frequency of the deflection drive means are matched such that the positions of the visibility region 330, 332, 334 do not overlap. This can also be seen in the figure. Light pulses are only provided at the points of time t2, t4 and t6. Due to the rotation frequency of the deflection drive means and the corresponding movement of the visibility region, the positions of the visibility region 330, 332, 334 do not overlap at those points of time. The second position of the visibility region 332 is displaced in relation to the first position of the visibility region 330 by the extent of the visibility region. Again, the third position of the visibility region 334 is displaced in relation to the second position of the visibility region 332 by the extent of the visibility region.

If at all points of time t1 to t6 a light pulse was provided, the positions of the visibility region would overlap and the observer could possibly perceive a blurred image.

In addition, it is possible that an eye position detection means detects the position of an eye 310. The light source means can then provide light pulses 320, 322, 324 depending on the eye position 310. In doing so, possible inaccuracies in the detection of the eye position 310 can be taken into account. As shown in the drawing, the first position of the visibility region 330 before the detected eye position is generated by the first light pulse 320. Then, according to this drawing, two further light pulses 322, 324 follow, which generate the positions of the visibility region 332, 334, which follow the first position of the visibility region 330. It is thus ensured that even if the eye position is detected somewhat inaccurate the eye at the eye position 310 will be reliably provided with a visibility region.

In order to prevent an observer from perceiving multiple perspectives, and consequently from seeing the object blurred, an identical object reconstruction can be provided to the subsequent positions of the visibility region with those subsequent light pulses.

The number of light pulses and positions of the visibility region is of course not limited as shown in this drawing.

Figure 4:
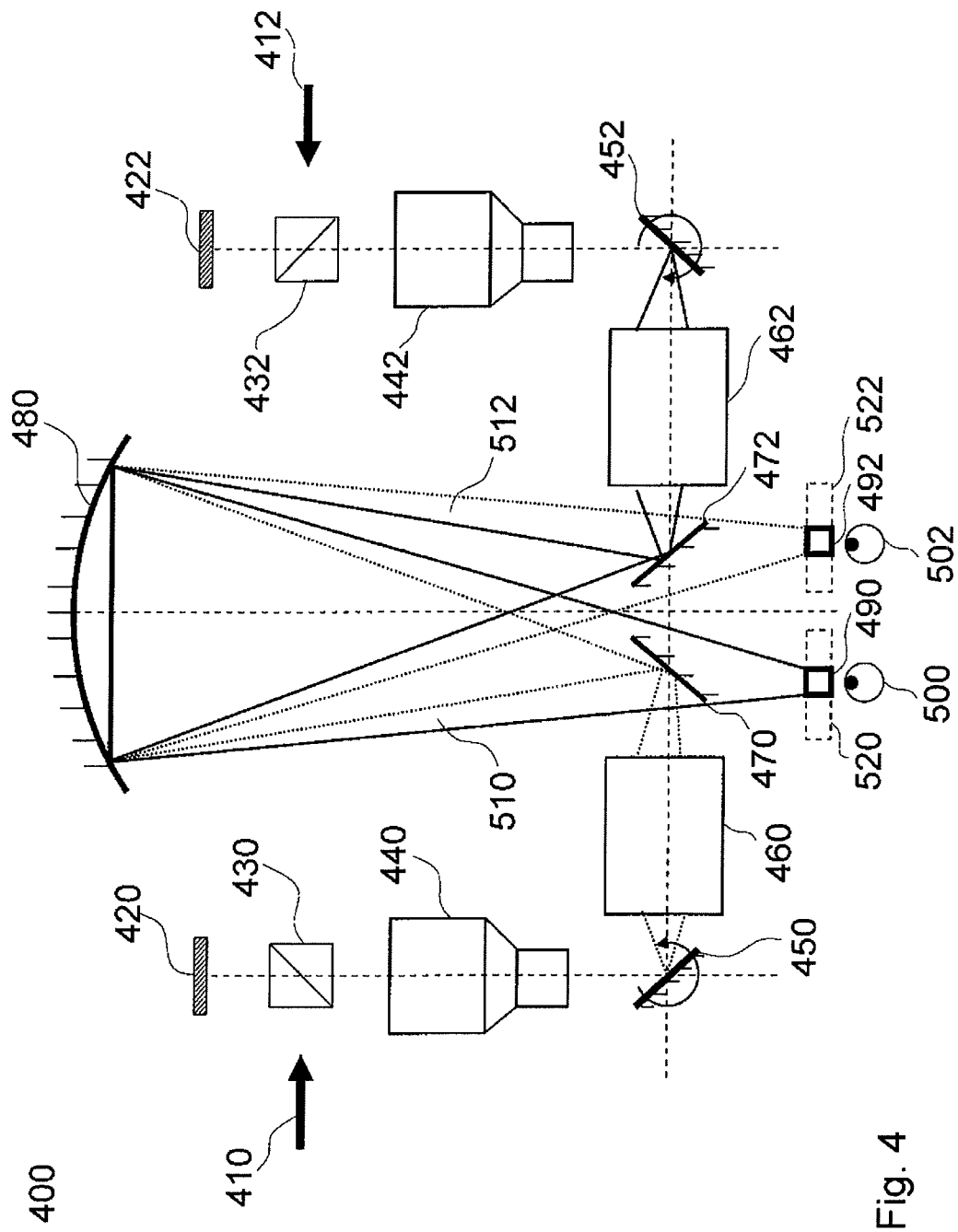
FIG. 4 is a simplified view of an inventive holographic reconstruction system according to an embodiment at a first point of time.

FIG. 4 is a simplified view of an inventive holographic reconstruction system 400 according to an embodiment at a first point of time. The drawing shows light source means 410, 412, spatial light modulator means (SLM) 420, 422, a beam splitter 430, 432, a telecentric lens 440, 442, deflection means 450, 452, a projection lens 460, 462 and reflection means 470, 472. The display screen 480 is only provided once in the entire arrangement. Further, a visibility region 490, 492, and eye position 500, 502, a reconstruction space 510, 512 and an enlarged visibility region 520, 522 are shown.

As can be seen in the drawing, the entire arrangement comprises two assemblies of analogous design. Each assembly generates the image for one eye. The following description relates to only one of those assemblies. A person skilled in the art can easily translate the principle to the other assembly. Generally, solutions with one assembly are possible as well, e.g. using time-division multiplexing methods.

The light source means 410 have the form of a pulsed laser in this embodiment. The pulsed laser can be temporally modulated optionally by electric control or mechanically. The light source means 410 can comprise a beam expander which expands the beam diameter of the laser. According to another embodiment, it is also possible to provide multiple lasers with different wavelengths. According to a still further embodiment, it is further possible to employ a different light source instead of a laser and to filter the coherent portion of the light.

The light source means 410 illuminate the telecentric lens 440 through the beam splitter 430, which has the property of reflecting light which is linear polarised in a certain direction. The SLM 420 is thus illuminated with as much light energy as possible. A diffraction pattern is provided on the SLM 420, which has a pixel grid, by way of amplitude modulation. After being reflected from the SLM 420, the diffracted laser light propagates towards the telecentric lens 440.

A shutter which causes the laser light to be spatially filtered is disposed in a focal plane or Fourier plane of an entry lens of the telecentric lens 440. Undesired orders of the diffraction are removed there. The light energy of the undesired order can be much higher than the portion of the desired order. The telecentric lens 440 projects a demagnified image, e.g. at a scale of 1:2, of the SLM 420 onto the deflection means 450. There is a demagnified, real intermediate image of the SLM 420.

In this embodiment, beam splitter 430, SLM 420 and telecentric lens 440 are collectively referred to as first optical means, which are disposed in front of the deflection means 450 in the optical path.

In this embodiment, the deflection means 450 have the form of a plane mirror, which is pivoted by deflection drive means (not shown in this drawing), e.g. a DC motor. The rotation axis of the deflection drive means lies in the plane of the mirror surface.

This is shown in FIG. 6. The light emitted by the telecentric lens 440 is deflected by the deflection means towards the projection lens 460.

In this embodiment, projection lens 460, reflection means 470 and display screen 480 are collectively referred to as second optical means, which are disposed behind the deflection means 450 in the optical path.

The projection lens 460 projects the demagnified image of the SLM 420 which is deflected by the deflection means 450 onto the reflection means 470. In this embodiment, the reflection means 470 is a plane mirror, which reflects the incident light towards the display screen 480. The display screen 480 has the form of a spherical mirror in this embodiment. The display screen 480 is arranged such that it effects a 1:1 projection of the Fourier plane of the SLM 420 into the visibility region 490. The reconstruction space 510 stretches between the display screen 480 and the visibility region 490 here. An eye of an observer which is situated at the eye position 500 sees the reconstructed scene in the reconstruction space 510 from the visibility region 490.

A rotation of the deflection means 450 changes the optical path such that the position of the visibility region 490 is continuously displaced within the enlarged visibility region 520. The extent of the enlarged visibility region 520 is spatially limited caused by the design of the holographic reconstruction system 400. When the deflection means 450 has completed a full revolution, then the visibility region 490 will appear at the beginning of the enlarged visibility region 520 again. The direction of displacement of the visibility region 490 depends on the direction of rotation of the deflection means 450. However, the direction of rotation is irrelevant for the general principle of the present invention.

Generally, the SLM 420 can be encoded with different holograms for each position of the visibility region 490 within the enlarged visibility region 520. If the enlarged visibility region 520 is rather small, it is however also possible to provide only one hologram code to the SLM for all positions of the visibility region 490 within that enlarged visibility region 520. Alternatively, an intermediate solution is also possible where the SLM 420 is encoded with one hologram for each section of the enlarged visibility region 520, said sections comprising at least two positions of the visibility region 490.

Figure 5:
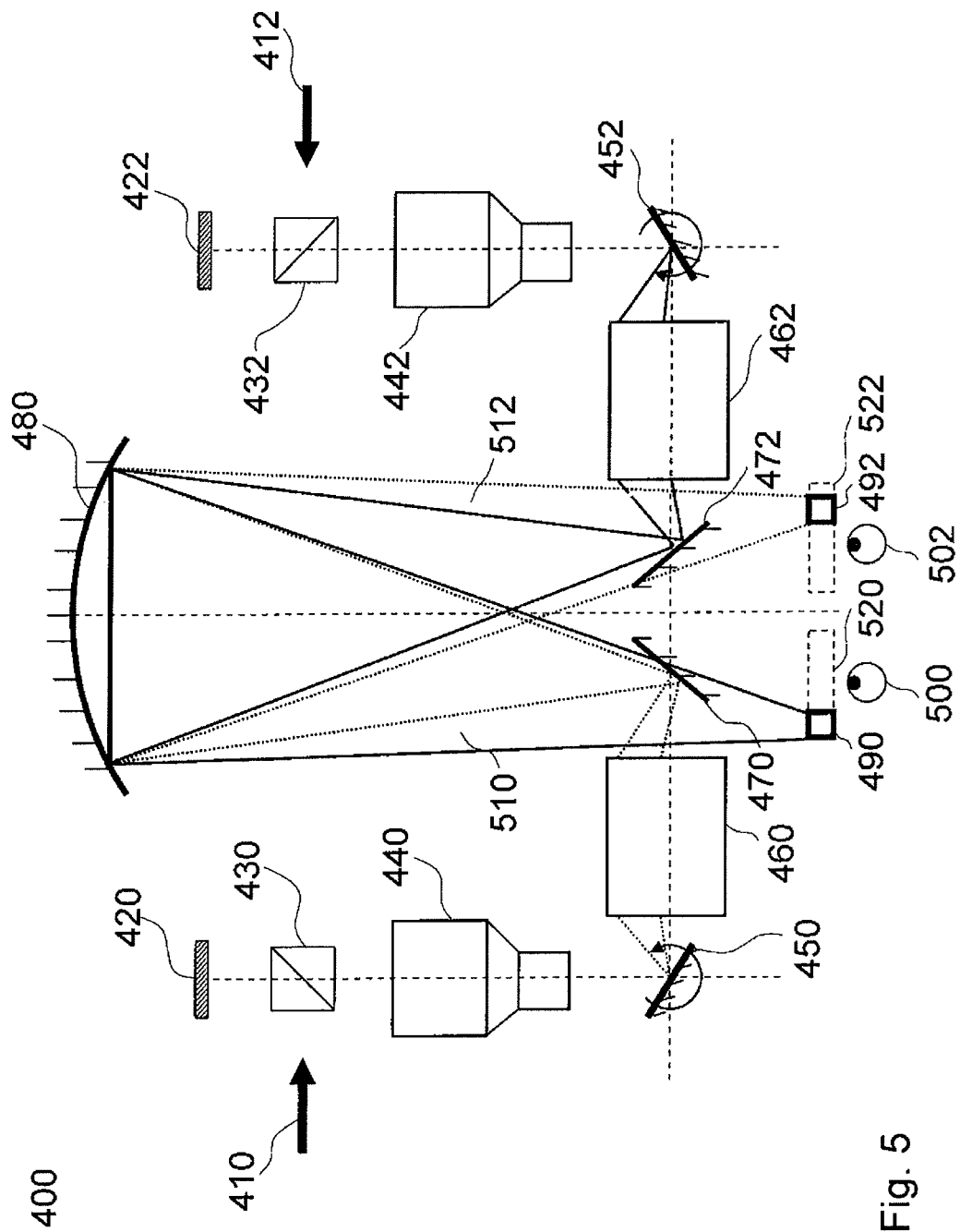
FIG. 5 is a simplified view of an inventive holographic reconstruction system according to the embodiment at a second point of time.

FIG. 5 is a simplified view of an inventive holographic reconstruction system according to the embodiment at a second point of time. The arrangement is the same as shown in FIG. 4.

In this drawing, the deflection means 450 have a different angular position compared with the situation shown in FIG. 4. The thus changed optical path also causes the visibility region 490 to have a different position within the enlarged visibility region 520.

At that second point of time the observer does not see any reconstruction of the holographic scene from the eye position 490. However, the rotation frequency of the deflection means 450 is high enough for the observer not to notice this. The visibility region 490 appears in front of his eye often enough for the holographically reconstructed scene to be perceived as a steady scene.

FIG. 6 is a simplified top view showing the mutual arrangement of deflection means and deflection drive means. It shows deflection means 610 with a reflective surface 620 and deflection drive means 630 with a shaft 640.

The shaft 640 is mounted to the deflection drive means 630, e.g. to a DC motor. The deflection drive means 630 rotate the shaft 640 around a rotation axis. The rotation axis lies in the centre of the shaft 640. The rotary movement is exemplarily indicated by an arrow in the drawing—however, the shaft can also rotate in the other direction. As can be seen in the Figure, the deflection means 610 is mounted to the shaft 640 such that the reflective surface 620 is disposed on the rotation axis, which lies in the centre of the shaft 640. If the shaft 640 rotates, then the reflective surface 620 will thus not move out of the centre of the shaft 640, so that no undesired effects occur such as undesired changes to the optical path.

The deflection drive means 630 have a rotational speed which is high enough for an observer not to perceive the movement of the visibility region as flickering. Further, the deflection drive means have a constant rotational speed, i.e. the rotational speed does not have any undesired fluctuations.

A holographic reconstruction system with an enlarged visibility region, and an according method, have been described above with reference to the accompanying drawings. However, the invention is not limited to the embodiments described above.

If elements of the holographic reconstruction system are arranged in a different way, elements can be omitted, integrated or combined with each other. Moreover, features of the individual embodiments can be combined with each other.

It is further also possible to generate a visibility region in which the observer can watch a holographically reconstructed scene with both eyes. The principle of the present invention can then be applied as well.

The invention claimed is:

1. Holographic reconstruction system with enlarged visibility region comprising

Light source means for providing substantially coherent light,

Reconstruction means for the holographic reconstruction of a scene and for generating a visibility region with a certain extent, from where the observer can watch the holographically reconstructed scene, Deflection means for positioning the visibility region, and Deflection drive means with a rotation axis for continuously rotating or pivoting the deflection means at a rotation frequency around the rotation axis, where the reconstruction means comprise first optical means having spatial light modulator means for modulating the light provided in front of the deflection means in the optical path, wherein the first optical means are provided for projecting a diminished intermediate image of the spatial light modulator means onto the deflection means.

2. Device according to claim 1, wherein the rotation or pivoting of the deflection means takes place continuously over an angular range so to displace the position of the generated visibility region continuously within the enlarged visibility region.

3. Device according to claim 2, comprising light source control means for controlling the switching frequency.

4. Device according claim 1, wherein the light source means periodically provide light pulses at a certain switching frequency.

5. Device according to claim 4, wherein switching frequency and rotation frequency have a certain ratio.

6. Device according to claim 4, wherein switching frequency and rotary frequency have such a ratio that the light source means deliver up to one light pulse within a displacement distance which corresponds to the extent of the visibility region in the direction of displacement.

7. Device according to claim 6, wherein the provision of light takes place depending on the detected position of the observer eye.

8. Device according to claim 1, wherein the reconstruction means are provided for computing the scene to be holographically reconstructed, which takes place depending on the position of the visibility region at preferably provided light.

9. Device according to claim 1, wherein the reconstruction means are provided for computing the scene to be holographically reconstructed for at least one selected position of the visibility region and for providing the computed scene to be holographically reconstructed for at least one position of the visibility region which succeeds the selected position.

10. Device according to claim 1, wherein the reconstruction means comprise second optical means for generating the visibility region provided behind the deflection means in the optical path.

11. Device according to claim 1, wherein the first optical means comprise at least one telecentric lens and the second optical means comprise at least one projection lens or projection mirror.

12. Device according to claim 1, wherein the deflection means are mirrors.

13. Device according to claim 12, wherein the deflection means are front surface mirrors.

14. Device according to claim 1, further comprising deflection drive control means for controlling the rotation frequency of the deflection drive means.

15. Holographic reconstruction method for holographically reconstructing a scene in a holographic reconstruction system with an enlarged visibility region, comprising The provision of substantially coherent light, The holographic reconstruction of a scene and the generation of a visibility region with a extent, from where an observer can watch the holographically reconstructed scene, The positioning of the visibility region with the help of deflection means, and The continuous rotation or pivoting of the deflection means at a certain rotation frequency around a rotation axis for displacing the visibility region within the enlarged visibility region.

* * * * *